United States Patent Office 2,721,160
Patented Oct. 18, 1955

2,721,160
PESTICIDAL COMPOSITIONS AND THEIR USE

Jack S. Newcomer, Grand Island, N. Y., assignor, by mesne assignments, to The Pennsylvania Salt Manufacturing Company, Philadelphia, Pa., a corporation of Pennsylvania No Drawing. Application May 21, 1951,
Serial No. 227,526

12 Claims. (Cl. 167—30)

The present invention pertains to pest control, and to methods and compositions for protecting materials, particularly organic materials, against attack by pests. More particularly, the invention pertains to new compositions which are employed in the control of pests, such as fungi, bacteria, and insects. Still more particularly, the invention pertains to compounds which are extremely effective agents for killing microorganisms, said compounds being of a type to be more particularly described hereinafter.

It is an object of this invention to provide compositions of outstanding value in protecting organic material, both in the natural and artificial state, said compositions being highly effective in controlling economically harmful pests which attack organic material. A further object is to provide compositions which are highly effective, at very low concentrations of active ingredient, in killing microorganisms or preventing or inhibiting their growth. Another object of the invention is to treat agricultural materials, whether in the natural or fabricated state, with the compositions of the invention, thereby both disinfecting and preserving such agricultural products. These and other objects will be apparent from this specification.

In the practice of the invention there is applied to the material which is to be protected against attack by pests at least one chlorinated-side-chain-substituted, monocyclic, unsaturated, five-membered, carbocyclic compound having chlorine substitution on the ring selected from the group consisting of 1,2,3,3,5,5-hexachloro-4-dichloromethylene-1-cyclopentene; pentachloro-1-trichlorovinyl-1,3-cyclopentadiene; pentachloro-5-alpha,beta,beta-trichloroethyl - 1,3 - cyclopentadiene; 1,2,3,3 - tetrachloro - 4 - dichloromethylene-1-cyclopentene; and 1,3,3,5,5-pentachloro-2- trichlorovinyl - 4 - dichloromethylene - 1 - cyclopentene; the structural formulae of which are as follows:

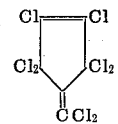

1,2,3,3,5,5-hexachloro-4-dichloromethylene-1-cyclopentene

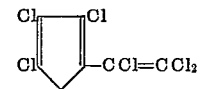

Pentachloro-1-trichlorovinyl-1,3-cyclopentadiene

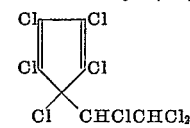

Pentachloro-5-alpha,beta,beta-trichloroethyl-1,3-cyclopentadiene

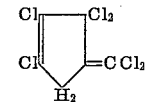

1,2,3,3-tetrachloro-4-dichloromethylene-1-cyclopentene

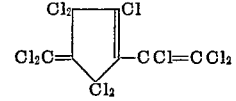

1,3,3,5,5-pentachloro-2-trichlorovinyl-4-dichloromethylene-1-cyclopentene

Methods for the preparation of the active ingredients are disclosed in literature references as follows: Prins, Rec. trav. chim. 65, 455–67 (1946); and Newcomer and McBee, Jour. Am. Chem. Soc. 71, 952–56 (1949).

The powerful pesticidal properties of the active ingredients of this invention are shown in the following examples, which are by way of illustration and not of limitation.

In the examples, concentrations of the active ingredients are expressed as parts by weight.

EXAMPLE 1

Representative compounds of the invention were evaluated as fungicides by the slide-spore germination procedure, in which the percentage of inhibition of spore

Table 1

| Active ingredient | Formulation | Incubation period, days | Inhibition of Spores, Percent | | | | | |
|---|---|---|---|---|---|---|---|---|
| | | | Scleratinia fructicola— Conc. of active ingredient | | | Glomerella cingulata— Conc. of active ingredient | | |
| | | | 1 p. p. m. | 10 p. p. m. | 100 p. p. m. | 1 p. p. m. | 10 p. p. m. | 100 p. p. m. |
| Water (control) | | 1 | 0 | 0 | 0 | 0 | 0 | 0 |
| | | 2 | 0 | 0 | 0 | 0 | 0 | 0 |
| | | 3 | 0 | 0 | 0 | 0 | 0 | 0 |
| Chloranil (commercial fungicide). | Water emulsion | 1 | 0 | 0 | 100 | 0 | 0 | 100 |
| | | 2 | 0 | 0 | 100 | 0 | 0 | 100 |
| | | 3 | 0 | 0 | 100 | 0 | 0 | 100 |
| A | do | 1 | 100 | 100 | 100 | 100 | 100 | 100 |
| | | 2 | 100 | 100 | 100 | 100 | 100 | 100 |
| | | 3 | 100 | 100 | 100 | 100 | 100 | 100 |
| B | do | 1 | 100 | 100 | 100 | 100 | 100 | 100 |
| | | 2 | 100 | 100 | 100 | 100 | 100 | 100 |
| | | 3 | 100 | 100 | 100 | 90 | 100 | 100 |
| | | 4 | 100 | 100 | 100 | 90 | 100 | 100 |
| C | do | 1 | 0 | 100 | 100 | 0 | 100 | 100 |
| | | 2 | 0 | 0 | 100 | 0 | 0 | 100 |
| | | 3 | 0 | 0 | 100 | 0 | 0 | 100 |

The water emulsions of the above compounds were prepared with the aid of a surface-active agent, e. g., soap.

germination is determined after a specified incubation period. These tests were conducted in accordance with the American Phytopathological Society method, except that they were continued for three or more days instead of only one day. The microorganisms employed were the brown peach-rot fungus (*Sclerotinia fructicola*) and the apple bitter-rot fungus (*Glomerella cingulata*). These organisms are typical of those which cause some of the major and difficultly controlled plant diseases.

The data obtained are given in Table 1, from which it can be seen that the compounds of the invention are very potent fungicides. For purposes of identification in the table, compounds are labeled as follows: 1,2,3,3,5,5-hexachloro-4-dichloromethylene-1-cyclopentene is designated in this and other tables as A; pentachloro-1-trichlorovinyl-1,3-cyclopentadiene as B; and pentachloro-5-alpha,beta,beta-trichloroethyl-1,3-cyclopentadiene as C.

EXAMPLE 2

The exceptionally high efficacy of the compounds of this invention in protecting fabrics from attack by microorganisms in the soil is illustrated in Table 2. Khaki textile strips (1" x 3") were dipped rapidly into acetone solutions of varying concentrations of the active ingredients, and then were placed across a coarse wire screen to allow the strips to dry. In all cases, the solvents evaporated within one minute. The treated strips were buried in well-rotted manure for varying periods. The strips were then recovered, washed with water, and allowed to dry. The degree of protection of the fabrics was determined by visual observation and also by determining the tensile strength of the strips.

Similar experiments were carried out with a commercial fabric preserver, namely, bis(2-chloro-6-hydroxyphenyl)methane.

*Table 2*

| Active ingredient | Conc. of active ingredient, percent | Days buried | Tensile Strength, lbs.—Triplicate experiments | | |
|---|---|---|---|---|---|
| | | | 1 | 2 | 3 |
| None (control) | | 17 | 7 | 14 | 1 |
| A | 1.0 | 11 | 146 | 135 | 152 |
| | 0.1 | 11 | 142 | 150 | 144 |
| | 0.01 | 11 | 105 | 74 | 51 |
| B | 1.0 | 17 | 136 | 123 | 102 |
| | 0.1 | 17 | 94 | 105 | 108 |
| | 0.01 | 17 | 23 | 32 | 23 |
| Commercial fabric preserver [1] | 1.0 | 17 | 155 | | |
| | 0.1 | 17 | 51 | | |
| | 0.01 | 17 | 35 | | |

[1] Bis(3-chloro-6-hydroxyphenyl)methane.

EXAMPLE 3

Materials which are to be used for the protection of agricultural crops from attack by microorganisms preferably have low phytotoxicity.

The favorable phytotoxic properties of the compounds of the invention are illustrated in Tables 3 and 4, which report the effects caused by applying to plants, sprays containing a representative compound, the particular compound being 1,2,3,3,5,5-hexachloro-4-dichloromethylene-1-cyclopentene. It is noteworthy that no phytotoxic effects were observed, although the dosages of active ingredient were considerably greater than dosages required to control microorganisms.

*Table 3*

TOXICITY TO TOMATO[1] PLANTS—SPRAY APPLICATION

| Active ingredient | Active ingredient, percent | Spray formulations | Observations, after treatment | |
|---|---|---|---|---|
| | | | 7 days | 10 days |
| None (control) | | Water only | Leaves green; plants began to bear | Leaves green; plants began to bear. |
| A | 0.1 | Water emulsion | As controls | As controls. |
| | 1.0 | do | do | Do. |

[1] Five Bonnie Best tomato plants were used in each test.

*Table 4*

TOXICITY TO BEAN[1] PLANTS—SPRAY APPLICATION

| Active ingredient | Active ingredient, percent | Spray formulations | Observations, after treatment | |
|---|---|---|---|---|
| | | | 7 days | 10 days |
| None (control) | | Water only | Normal development | Normal development. |
| A | 0.1 | Water suspension | As controls | As controls. |
| | 1.0 | do | do | Do. |

[1] Five Black Valentine bean plants per test.

EXAMPLE 4

Various techniques have been employed for determining the phytotoxic characteristics of the compounds of this invention.

For example, 0.5 ml. of a 1.0% solution of 1,2,3,3,5,5-hexachloro-4-dichloromethylene-1-cyclopentene caused no injury whatsoever to Black Valentine bean plants when the solution was placed on the leaves and the progress of the plants was observed for 8 days after treatment.

As high as 15 ml. of a 1% suspension (equivalent to a dosage of 45 lbs. per acre) of the same chemical was sprayed onto each of several Bonnie Best tomato plants. After several days of observation, no phytotoxic effects were observed. Similarly, pentachloro-1-trichlorovinyl-1,3-cyclopentadiene caused no phytotoxicity when applied at the rate of 1.5 lbs. per acre.

EXAMPLE 5

The relative non-phytotoxicity of the compounds of this invention was also shown by incubating Clark's Special cumcumber seeds and Zenith rice seeds in solutions of the compounds for as long as 10 days.

For example, germination of the seeds was retarded only slightly in aqueous solutions having a 0.1% concentration of 1,2,3,3,5,5-hexachloro-4-dichloromethylene-1-cyclopentene. At lower concentrations of this compound, there was no observable effect on the germination of the seeds. This compound possesses extremely high pesticidal properties and extremely low phytotoxic properties.

EXAMPLE 6

The efficacy of pentachloro-1-trichlorovinyl-1,3-cyclopentadiene as an insecticide was demonstrated by applying dilute acetone solutions of the chemical to houseflies (*Musca domestica*). The standard drop-deposition method of evaluation was employed. The results were recorded 21 hours after treatment. It was found that 100% of the flies were dead when the above active ingredient was applied in concentrations as low as 0.5% in acetone. A control test conducted with acetone alone showed no flies dead or affected.

EXAMPLE 7

Pentachloro - 5 - alpha,beta,beta - trichloroethyl - 1,3-cyclopentadiene was evaluated as an insecticide by the procedure of Example 6. Observations were made 24 hours after treatment and it was found that 100% of the houseflies were either dead or seriously affected when the above active ingredient was applied in concentrations as low as 0.5% in acetone. In a control test using acetone alone, no flies were dead or affected.

EXAMPLE 8

The effect of 1,2,3,3,5,5-hexachloro-4-dichloromethylene-1-cyclopentene upon carpet beetle larvae (*Attagenus piceus*) was determined, employing the official method of the American Association of Textile Chemists and Colorists.

Acetone solutions of the above compound were applied to standard woolen test discs, and the acetone was allowed to evaporate. Since the solutions applied were of known volumes and concentrations, the weights of applied protectant (based on the weight of fabric) were known. Results were observed 24 days after the test was started. The larvae had fed rather heavily on fabric containing only 0.01% of the protectant, but had not fed on fabric containing 0.1% of the protectant. A control test was conducted in which acetone alone was applied to test discs; the larvae had fed heavily on these discs.

EXAMPLE 9

Pentachloro - 1 - trichlorovinyl - 1,3 - cyclopentadiene was tested against carpet beetle larvae (*Attagenus piceus*), using the same procedure as in Example 8, except that the test was carried out for 19 days. It was noted that the larvae had fed rather heavily on fabric containing only 0.01% of the protectant, but had not fed on fabric containing 0.1% of the protectant. In a control test in which acetone alone was applied to test discs, the larvae had fed heavily on the discs.

It will be understood that my active ingredients may be used individually or in admixtures with each other for the desired purposes.

It is pointed out that any active ingredient of the invention may be substituted for the active ingredients of the above examples, and that the specific pests employed are merely representative of pests against which my compositions may be used.

The active ingredients of this invention may be applied in a variety of ways to materials which are to be protected against attack by microorganisms, such as by dusting, spraying, dipping, or tumbling, as best suits the protection problem at hand. They may be used as such in certain cases, but more frequently they are formulated with carriers before application. Carriers may be liquid, for example, water or certain oils, or solid, for example, any of the solid carriers or mixtures thereof more particularly referred to hereinafter.

Compositions may be formulated by mixing the active ingredients with any desired liquid or solid carriers, such as any of the finely divided solid carriers known in the dusting art, which are preferably of large surface area, such as clays, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer clay, Celite, and Tripoli may be mentioned as typical.

Non-clay carriers which may be formulated with my active ingredients include, for example, sulfur, volcanic ash, lime products such as hydrated lime and calcium carbonate, byproduct lignin, lignocellulose, flours such as wood, walnut shell, wheat, soybean, potato and cottonseed, or any other suitable material employed for similar purposes in the art.

Any desired formulation may be prepared by any suitable method. Thus the active ingredient, preferably in finely divided form if a solid, may be tumbled together with the carrier, or the carrier and the active ingredient may be ground together. Alternatively, the active ingredient in liquid form, including solutions, dispersions, emulsions, and suspensions thereof, may be admixed with the solid carrier in finely divided form in amounts small enough to preserve the free-flowing property of the final dust composition. If desired, excess liquid may be removed, such as by vaporization, for example, under reduced pressure.

When solid compositions are employed, in order to obtain a high degree of coverage with a minimum dosage of the formulation, it is desirable that the formulation be in finely divided form. Preferably, the dust containing the active ingredient should be sufficiently fine that substantially all will pass through a 50 mesh sieve, and more particularly through a 200 mesh sieve. Appreciably larger particle size is less conducive to obtaining an economic application of the material; finer dusts, although they have excellent covering capacity, are somewhat more subject to drift and are more expensive to prepare.

For dusting purposes I prefer a formulation in which the active ingredient is present to the extent of say 10–50% by weight of the total. Such amounts normally give free-flowing products which dust easily. However, these concentrations are only indicative of ranges that give desirable qualities to dusting compositions, and formulations may be made with higher or lower active ingredient content. Thus, compositions containing between say 1% to 99% of active ingredient by weight are contemplated, the remainder being carrier and/or any other additive or adjacent material which may be desired.

It is often advantageous to add small percentages of wetting agents to dust formulations, such as the wetting agents mentioned hereinafter.

For spray application the active ingredient may be dissolved or dispersed in a liquid carrier, such as water or other suitable liquid.

Aqueous solutions or dispersions are economical, and hence are frequently preferred. In general, the choice of the particular liquid carrier employed will be guided somewhat by prevailing circumstances, such as its availability, its solubility or dispersion characteristics toward the particular active ingredient, and in the case of the treatment of plants, by its toxicity to such plants. In general, water is an excellent liquid carrier, although in the case of the treatment of plants a relatively non-phytotoxic oil, such as diesel oil #2, may at times be preferred.

Thus, spray formulations comprising the active ingredient in the form of a solution, suspension, dispersion, or emulsion, in aqueous or non-aqueous media may be employed.

Emulsions or dispersions of the active ingredient in the liquid carrier may be prepared by agitation of the active ingredient with the carrier. In many instances this is done at the time of spraying. Preferably, however, the agitation should take place in the presence of an emulsifying or dispersing agent (surface-active agent), in order to facilitate the preparation of said emulsion or dispersion. Emulsifying or dispersing agents are well-known in the art, and include, for example, fatty alcohol sulfates, such as sodium lauryl sulfate, aliphatic or aromatic sulfonates, such as sulfonated castor oil or fish oil, or the various alkaryl sulfonates (such as the sodium salt of mono-sulfonated nonyl naphthalene or tertiary dodecyl benzene), or the soaps, such as sodium oleate and sodium stearate, or non-ionic types of emulsifying and dispersing agents such as the high molecular weight alkyl polyglycolethers or analogous thioethers such as the decyl, dodecyl, and tetradecyl polyglycolethers and thioethers containing from 25 to 75 carbon atoms. Such emulsifying and dispersing agents, it will be noted, also commonly possess wetting agent properties.

The use, if desired, of adjuvants, such as wetting agents and/or humectants, is also contemplated in connection with solutions, suspensions, dispersions, emulsions, or solid formulations of the active ingredient. Any suitable wetting agent and/or humectant may be employed for this purpose, such as the wetting agents more particularly referred to above.

Examples of humectants are glycerine, diethylene glycol, ethylene glycol, polyethylene glycols generally, and well-known sugars and sugar-containing mixtures, such as glucose, fructose, sucrose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more, based on active ingredient. For mere wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent, these considerations being particularly applicable in the case of the treatment of plants.

It should be noted that after liquid formulations of my active ingredients have been applied to plants, the concentration of wetting agent existing upon such treated plants is in no sense a function of the conentration existing in the original formulation. Thus, evaporation might concentrate the wetting agent considerably, or the presence of dew on plant surfaces, or of plant juices on such surfaces might considerably dilute the wetting agent.

It will of course be understood that wetting agents, particularly when in solid form, may be compounded with solid forms of the active ingredient.

Although the active ingredients of this invention may be applied without dilution to materials which are to be protected against attack by microorganisms, it is usually desirable to employ liquid or solid formulations, for example, formulations such as those discussed above. In the case of liquid formulations, the active ingredient usually constitutes less than 30% by weight of the total, such as less than 10% and even as low as 0.1%.

Other substances than the carrier, surface-active agent, and/or humectant may be included in solid or liquid formulations of the active ingredients if desired, such other substances including spreaders, stickers, and other auxiliary materials. Active ingredients other than those disclosed herein and compatible with the formulation may be added if desired for any particular purpose. For example, it may at times be expedient to include singly or in combination, substances such as plant response agents, or substances such as fungicides, insecticides, or bactericides other than those agents discussed herein. Also, substances may be added to bring about various physical improvements such as prevention of lumping during storage, etc.

In addition to the treatment of agricultural products generally including growing plants, seeds, etc. for destroying plant disease organisms or preventing or inhibiting their growth, the compositions of this invention are generally useful as bactericidal agents and fungicides. For example my compositions may be employed advantageously as preservatives for such substances as rawhide, adhesives such as glue, gelatin, leather, cellulosic substances such as cork, wood, cotton fabrics, cordage, etc., wool, ink, casein products, and other natural or manufactured products that are subject to attack or decomposition by various bacteria and molds.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

I claim:

1. A composition prepared for use in the control of one of the group consisting of microrganisms and insects, comprising a surface active agent, and at least one of the group consisting of 1,2,3,3,5,5-hexachloro-4-dichloromethylene-1-cyclopentene; pentachloro-1-trichlorovinyl-1,3-cyclopentadiene; pentachloro-5-alpha, beta, beta-trichloroethyl-1,3-cyclopentadiene; 1,2,3,3-tetrachloro-4-dichloromethylene-1-cyclopentene; and 1,3,3,5,5-pentachloro - 2 - trichlorovinyl - 4 - dichloromethylene - 1 - cyclopentene, said composition forming an emulsion with water upon agitation therewith.

2. A composition prepared for use in the control of one of the group consisting of microorganisms and insects, comprising a surface active agent, and 1,2,3,3,5,5-hexachloro-4-dichloromethylene-1-cyclopentene, said composition forming an emulsion with water upon agitation therewith.

3. A composition prepared for use in the control of one of the group consisting of microorganisms and insects, comprising a surface active agent, and pentachloro-1-trichlorovinyl-1,3-cyclopentadiene, said composition forming an emulsion with water upon agitation therewith.

4. A composition prepared for use in the control of one of the group consisting of microorganisms and insects, comprising a surface active agent, and pentachloro-5-alpha,beta,beta-trichloroethyl-1,3-cyclopentadiene, said composition forming an emulsion with water upon agitation therewith.

5. A process for protecting material from attack by one of the group consisting of microorganisms and insects, comprising applying to said material an effective amount of at least one of the group consisting of 1,2,3,3,5,5 - hexachloro - 4 - dichloromethylene - 1 - cyclopentene; pentachloro-1-trichlorovinyl-1,3-cyclopentadiene; pentachloro - 5 - alpha,beta,beta - trichloroethyl - 1,3-cyclopentadiene; 1,2,3,3-tetrachloro-4-dichloromethylene-1-cyclopentene; and 1,3,3,5,5-pentachloro-2-trichlorovinyl-4-dichloromethylene-1-cyclopentene.

6. A process for protecting material from attack by one of the group consisting of microorganisms and insects, comprising applying to said material an effective amount of 1,2,3,3,5,5-hexachloro-4-dichloromethylene-1-cyclopentene.

7. A process for protecting material from attack by one of the group consisting of microorganisms and insects, comprising applying to said material an effective amount of pentachloro-1-trichlorovinyl-1,3-cyclopentadiene.

8. A process for protecting material from attack by one of the group consisting of microorganisms and insects, comprising applying to said material an effective amount of pentachloro-5-alpha,beta,beta-trichloroethyl-1,3-cyclopentadiene.

9. A process for destroying one of the group consisting of microorganisms and insects which comprises exposing the same to a lethal concentration of at least one of the group consisting of 1,2,3,3,5,5-hexachloro-4-dichloromethylene-1-cyclopentane; pentachloro-1-trichlorovinyl-1,3 - cyclopentadiene; pentachloro - 5 - alpha,beta,beta-trichloroethyl-1,3-cyclopentadiene; 1,2,3,3-tetrachloro-4-dichloromethylene-1-cyclopentene; and 1,3,3,5,5-pentachloro - 2 - trichlorovinyl - 4 - dichloromethylene - 1-cyclopentene.

10. A process for destroying one of the group consisting of microorganisms and insects which comprises exposing the same to a lethal concentration of 1,2,3,3,5,5-hexachloro-4-dichloromethylene-1-cyclopentene.

11. A process for destroying one of the group consisting of microorganisms and insects which comprises exposing the same to a lethal concentration of pentachloro-1-trichlorovinyl-1,3-cyclopentadiene.

12. A process for destroying one of the group consisting of microorganisms and insects which comprises exposing the same to a lethal concentration of pentachloro - 5 - alpha,beta,beta - trichloroethyl - 1,3 - cyclopentadiene.

References Cited in the file of this patent

UNITED STATES PATENTS

| 2,548,509 | Yowell | Apr. 10, 1951 |

FOREIGN PATENTS

| 903,005 | France | Jan. 5, 1945 |